(12) United States Patent
Taubman

(10) Patent No.: US 11,936,879 B2
(45) Date of Patent: Mar. 19, 2024

(54) METHOD AND APPARATUS FOR COMPLEXITY CONTROL IN HIGH THROUGHPUT JPEG 2000 (HTJ2K) ENCODING

(71) Applicant: KAKADU R & D PTY LTD, Redfern (AU)

(72) Inventor: David Scott Taubman, Surry Hills (AU)

(73) Assignee: KAKADU R & D PTY LTD, Red Fern (AU)

( * ) Notice: Subject to any disclaimer, the term of this patent is extended or adjusted under 35 U.S.C. 154(b) by 217 days.

(21) Appl. No.: 17/770,327

(22) PCT Filed: Oct. 26, 2020

(86) PCT No.: PCT/AU2020/051151
§ 371 (c)(1),
(2) Date: Apr. 20, 2022

(87) PCT Pub. No.: WO2021/077178
PCT Pub. Date: Apr. 29, 2021

(65) Prior Publication Data
US 2022/0394272 A1  Dec. 8, 2022

(30) Foreign Application Priority Data

Oct. 25, 2019 (AU) ............................... 2019904032

(51) Int. Cl.
*H04N 19/147* (2014.01)
*H04N 19/124* (2014.01)
(Continued)

(52) U.S. Cl.
CPC ......... *H04N 19/147* (2014.11); *H04N 19/124* (2014.11); *H04N 19/172* (2014.11);
(Continued)

(58) Field of Classification Search
CPC .. H04N 19/124; H04N 19/126; H04N 19/147; H04N 19/149; H04N 19/172;
(Continued)

(56) References Cited

U.S. PATENT DOCUMENTS

| | | | |
|---|---|---|---|
| 6,356,665 B1* | 3/2002 | Lei | H04N 19/186 375/E7.072 |
| 2002/0009233 A1* | 1/2002 | Pesquet-Popescu | H04N 19/186 375/E7.185 |

(Continued)

FOREIGN PATENT DOCUMENTS

WO  WO2020073098 A1  4/2020

OTHER PUBLICATIONS

Taubman et al. "High Throughput JPEG 2000 (HTJ2K): Algorithm, Performance, and Potential"; Kakadu R&D Pty Ltd. and UNSW Sydney, Australia; Sep. 10, 2019.

(Continued)

*Primary Examiner* — Peter D Le
(74) *Attorney, Agent, or Firm* — Ballard Spahr LLP

(57) ABSTRACT

Methods for management of encoding complexity for image and video encoding, for example for algorithms belonging to the JPEG 2000 family of standards, where the encoding process targets a given compressed size (i.e. a total coded length) for the image or for each frame of a video sequence. Described are a set of methods for complexity constrained encoding of HTJ2K code-streams, involving collection of local or global statistics for each sub-band (not for each code-block), generation of forecasts for the statistics of sub-band samples that have not yet been produced by spatial transformation and quantization processes, and the use of this information to generate a global quantization parameter, from which the coarsest bit-plane to generate in each code-block can be deduced. Coded length estimates can be (Continued)

generated in a manner that enables latency and memory to be separately optimized against encoded image quality, while maintaining low computational complexity.

17 Claims, 6 Drawing Sheets

(51) Int. Cl.
    *H04N 19/172*     (2014.01)
    *H04N 19/176*     (2014.01)
    *H04N 19/196*     (2014.01)
    *H04N 19/61*     (2014.01)

(52) U.S. Cl.
    CPC ......... *H04N 19/176* (2014.11); *H04N 19/196* (2014.11); *H04N 19/61* (2014.11)

(58) Field of Classification Search
    CPC .. H04N 19/176; H04N 19/184; H04N 19/196; H04N 19/61; H04N 19/647
    See application file for complete search history.

(56) References Cited

U.S. PATENT DOCUMENTS

| | | | | |
|---|---|---|---|---|
| 2002/0150164 A1* | 10/2002 | Felts | ..................... | H04N 19/61 375/E7.125 |
| 2003/0063810 A1* | 4/2003 | Chebil | ............... | H04N 19/1883 375/E7.184 |
| 2004/0006582 A1* | 1/2004 | Hagihara | ............. | H04N 19/136 375/E7.184 |
| 2004/0213347 A1* | 10/2004 | Kajiwara | ............. | H04N 19/635 375/E7.065 |
| 2004/0264785 A1* | 12/2004 | Suino | ..................... | H04N 19/63 375/E7.048 |
| 2006/0008038 A1* | 1/2006 | Song | ..................... | H04N 19/577 375/350 |
| 2009/0279803 A1* | 11/2009 | Moon | ..................... | H04N 19/63 382/244 |
| 2010/0119167 A1* | 5/2010 | Ikeda | ..................... | H04N 19/18 382/248 |
| 2011/0010400 A1* | 1/2011 | Hayes | ..................... | G01S 7/48 707/803 |
| 2014/0122962 A1* | 5/2014 | Kodavalla | ............. | H04N 19/89 714/755 |
| 2016/0119637 A1* | 4/2016 | Eslami | ................ | H04N 19/645 375/240.19 |
| 2018/0288419 A1* | 10/2018 | Yu | ........................ | H04N 19/132 |
| 2019/0075222 A1* | 3/2019 | Oto | ..................... | H04N 17/002 |
| 2020/0128274 A1* | 4/2020 | Rosewarne | .......... | H04N 19/645 |

OTHER PUBLICATIONS

Taubman, D., A. Naman and R. Mathew, "FBCOT: a fast block coding option for JPEG2000," in SPIE Optics and Photonics: Applications of Digital Imaging, San Diego, 2017.

Taubman, D., "Software architectures for JPEG2000," in Proc. IEEE Int. Conf. DSP, Santorini, Greece, 2002.

International Search Report and Written Opinion dated Dec. 23, 2020 by the International Searching Authority for International Application No. PCT/AU2020/051151 filed on Oct. 26, 2020 and published as WO/2021/077178 (Applicant—Kakadu R&D Pty Ltd) (8 pages).

International Preliminary Report on Patentability dated Oct. 21, 2021 by the International Searching Authority for International Application No. PCT/AU2020/051151 filed on Oct. 26, 2020 and published as WO/2021/077178 (Applicant—Kakadu R&D Pty Ltd) (5 pages).

Taubman, D., "High Throughput Block Coding in the HTJ2K Compression Standard", ARXIV, 2019, pp. 1079-1083.

* cited by examiner

METHOD AND APPARATUS FOR COMPLEXITY CONTROL IN HIGH THROUGHPUT JPEG 2000 (HTJ2K) ENCODING

CROSS-REFERENCE TO RELATED APPLICATIONS

This application is a U.S. National Phase Application of International Application No. PCT/AU2020/051151, filed Oct. 26, 2020, which claims priority to Australian Application No. 2019904032, filed Oct. 25, 2019, each of which are hereby incorporated by reference in their entirety.

FIELD OF THE INVENTION

This invention relates to image and video encoding. More particularly, but not exclusively, it relates to the management of encoding complexity, particularly, but not exclusively, for algorithms belonging to the JPEG 2000 family of standards, where the encoding process targets a given compressed size (i.e. a total coded length) for the image or for each frame of a video sequence.

Embodiments described in this disclosure are particularly beneficial when applied to the coding technology known as High Throughput JPEG 2000 (HTJ2K), which is described in Part-15 of the JPEG 2000 family of standards—formally ITU-T Rec T.814|ISO/IEC 15444-15. HTJ2K defines a new "HT block coding algorithm" that can be used with the compression technology in other parts of the JPEG 2000 family of standards. However, the embodiments described in this disclosure can also have benefit when encoding video content with the original block coding algorithm of JPEG 2000 Part-1.

BACKGROUND OF THE INVENTION

For most conventional compression algorithms, the only way to achieve a target compressed size is to adjust a set of quantization parameters, usually via a master parameter such as a quality factor (JPEG) or a QP parameter (H.264/AVC, H.265/HEVC). This is either done through iterative encoding at the whole image level, until the compressed size is close to the target value, or through on-line progressive adaptation so that the compressed quality varies across the image. In the first case, computation and memory consumption can be very high, while in the second case image quality can suffer and the compressed size cannot be deterministically constrained.

By contrast, JPEG 2000 can achieve a target compressed size without the need for iteration or adaptation of quantization parameters. This is because each code-block of each sub-band has an embedded representation, allowing distortion to be traded for compressed size in a near optimal manner after the encoding is complete, simply by truncating each block's embedded bit-stream. This is normally achieved using the Post Compression Rate-Distortion optimization (PCRD-opt) algorithm described in conjunction with the original Embedded Block Coding with Optimal Truncation (EBCOT) algorithm on which JPEG 2000 is based.

Recently, a new Part-15 has been added to the JPEG 2000 family of standards. Also known as "High Throughput JPEG 2000," Part-15 describes a new high throughput block coding algorithm. For convenience, we refer to the original embedded block coding algorithm here as "J2K-1" and the new algorithm as "HT" for High Throughput. Unlike J2K-1, the HT algorithm does not produce a fully embedded bit-stream for each code-block. However, it does produce a set of partially embedded coding passes that are organized into so-called "HT Sets." A single HT set comprises an HT Cleanup coding pass, an HT SigProp coding pass and an HT MagRef coding pass, which can be directly associated with Cleanup, SigProp and MagRef coding passes produced by the J2K-1 block coder.

The relationship between J2K-1 and HT coding passes is illustrated in FIG. 1. Each HT Set is associated with a base bit-plane index p. The HT Cleanup pass for that set encodes all samples in the code-block to the precision associated with magnitude bit-plane p, while the HT SigProp and HT MagRef coding passes, if present, refine the precision of certain samples to the next finer bit-plane p−1. Accordingly, these last two passes are known as HT refinement passes. J2K-1 does the same thing, except that where the HT Cleanup pass fully encodes all samples to bit-plane p (not embedded), the corresponding J2K-1 Cleanup pass refines all samples to the precision of bit-plane p, taking into account all information provided by previous coding passes (embedded).

An advantage of the HT block coding algorithm is that it can execute with much higher throughput, both in software and hardware, also consuming much less computational energy. For decoding, it is only necessary to decode one HT Set. Even if multiple HT Sets are encoded, only one of them is typically included in the final code-stream, and it is always sufficient for the decoder to process at most one HT Set per code-block—one HT Cleanup pass (if it exists) and any HT SigProp and HT MagRef refinement passes that are present within the same HT Set.

For encoders, the HT block coding algorithm presents a greater range of opportunities to optimize the trade-off between complexity/throughput and image quality. FIG. 2 illustrates the elements of an HTJ2K encoder. HTJ2K substantially preserves the existing architecture and code-stream syntax of JPEG 2000. Imagery is first subjected to any required multi-component transforms and/or non-linear point transforms, as allowed by Part-1 or Part-2 of JPEG 2000, after which transformed image components are processed by a reversible or irreversible Discrete Wavelet Transform (DWT), which decomposes each component into a hierarchy of detail sub-bands and one base (LL) sub-band.

All sub-bands are partitioned into blocks whose size is no more than 4096 samples, with typical dimensions being 64×64 or 32×32; very wide and short blocks such as 1024×4 are also important for low latency applications. Each block is individually quantized (if irreversible) and coded, producing a block bit-stream comprising zero or more coding passes.

In the encoder, an optional Post-Compression Rate-Distortion optimization (PCRD-opt) phase is used to discard generated coding passes so as to achieve a rate or distortion target, which may be global (whole code-stream) or local (small window of code-blocks). Finally, the bits belonging to the selected coding passes from each code-block are assembled into J2K packets to form the final code-stream.

In both the J2K-1 and HT block coders, an encoder may drop any number of trailing coding passes from the information included in the final code-stream. Indeed, the encoder need not generate such coding passes in the first place if it can reasonably anticipate that they will be dropped. Strategies for doing this are discussed in D. Taubman, "Software architectures for JPEG2000," in *Proc. IEEE Int. Conf. DSP, Santorini, Greece,* 2002 and are routinely deployed, at least in software implementations.

With the HT block coder, both leading and trailing coding passes may be dropped (or never generated) by an encoder, so long as the first emitted coding pass is a Cleanup pass. As it turns out, it is usually sufficient for an HT encoder to generate just 6 coding passes, corresponding to two consecutive HT Sets, such as those identified in FIG. 1 as HT Set-1 and HT Set-2. Later, the PCRD-opt stage shown in FIG. 2 selects at most 3 passes of the generated coding passes from each code-block for inclusion in the final code-stream, where the selected passes belong to a single HT Set.

In some cases, there is no need for an encoder to generate more than a single HT Cleanup pass. This is certainly true for lossless compression, where only the Cleanup pass for p=0 is of interest; this pass belongs to a degenerate HT Set, identified as the "HT Max" set in FIG. 1, which can have no refinement passes. During irreversible compression, the distortion associated with the HT Max set depends upon the quantization parameters that can be set to achieve a desired level of image quality, in exactly the same way that quantization is used to control compression in JPEG and most other media codecs.

As suggested above, there are multiple ways for an HTJ2K encoder to compress an image or video source. The simplest approach is to generate just the single-pass HT Max set, managing the trade-off between image quality and compressed size by modulating quantization parameters.

At the opposite extreme, an encoder can generate all possible HT coding passes—one HT Set for each significant magnitude bit-plane of each code-block—leaving the PCRD-opt rate control algorithm to determine an optimal point at which to truncate the quality of each code-block and then selecting the Cleanup, SigProp and MagRef passes (at most one of each) that need to be included in the final code-stream for the determined truncation point of each code-block. This is extremely wasteful of both computation and memory. In an optimized implementation, this approach is still computationally advantageous in comparison to the J2K-1 algorithm, by a substantial factor (e.g., 4 to 5 times faster), but the cost of temporarily buffering the coded data in memory is considerably higher than for J2K-1, since multiple HT Cleanup passes contain redundant information. For reference, we refer to this as "HTFull" coding.

The applicant's prior International Patent Application No. PCT/AU2019/051105, now published as WO2020/073098 describes various methods for determining the number of leading coding passes to drop (equivalently, the coarsest HT Set to generate) in video encoding applications. In the first method, the encoder uses information gathered from previous frames to establish constraints on the coded lengths for the generated HT coding passes of each code-block in a current frame, using an iterative encoding technique to ensure that at least some passes satisfy the constraints, after which the PCRD-opt algorithm is executed. This method has the difficulty that the number of coding passes that need to be generated for each code-block cannot be deterministically bounded ahead of time.

In a second method described in WO2020/073098, various attributes of the PCRD-opt decision made for each code-block in a previous frame are recorded for use in determining a suitable range of coding passes to generate for the same code-block in a subsequent frame, so that the set of generated coding passes adapts over time to higher or lower precisions, on a code-block by code-block basis. The intent is to provide a suitable range of options to the PCRD-opt algorithm in the current frame, while constraining the number of passes generated for any given code-block in a deterministic way. For later reference in experimental comparisons, this method is known here as the "PCRD-Stats" method. The "PCRD-Stats" method has the drawback that it cannot respond rapidly to changes in scene complexity over time—e.g., scene cuts. Both of these methods are suitable only for video coding, as opposed to still image encoding.

WO2020/073098 describes a further method in which model-based techniques are used to convert the statistics of quantized sub-band statistics for each code-block into estimates of the coded length and distortion at each of a large set of truncation points. The estimated distortion-length characteristics for each code-block are supplied to a crude PCRD-opt algorithm which estimates roughly optimal truncation points for each code-block based on the overall target compressed length. These estimated truncation points are then used to determine a range of coding passes to actually generate, the results of which are fed to the full PCRD-opt stage. This method is complex to implement, and can require significant amounts of memory to buffer sub-band samples between the point at which statistics are collected for the first (crude) PCRD-opt stage and the point at which the code-block samples are actually coded.

SUMMARY OF THE INVENTION

Embodiments of the invention describe a new set of methods for complexity constrained encoding of HTJ2K code-streams, involving collection of local or global statistics for each sub-band (not for each code-block), generation of forecasts for the statistics of sub-band samples that have not yet been produced by spatial transformation and quantization processes, and the use of this information to generate a global quantization parameter, from which the coarsest bit-plane to generate in each code-block can be deduced in a simple manner. In an embodiment, application of the method can be executed on-line (i.e., dynamically), as sub-band samples are generated, to determine a collection of HT Sets to generate for each code-block for which quantized samples are available. The method can also be deferred until all sub-band samples for an image or video frame have been generated and buffered in memory, producing the coarsest bit-plane and hence a range of HT Sets to be generated for all code-blocks in the image or frame, after which the encoding itself can occur. These variations support a range of applications and deployment platforms, including low- and high-memory configurations. Embodiments describe forecasting methods that can be used to achieve low memory encoding to a target compressed size even for still images; efficient adaptive forecasting methods are disclosed that can utilize temporal information in video encoding applications, while remaining robust to rapid changes in scene complexity.

Differences between the embodiments described herein, and those methods previously described for complexity constrained encoding with a block coding algorithm that is only partially embedded (see also D. Taubman, A. Naman and R. Mathew, "FBCOT: a fast block coding option for JPEG2000," in *SPIE Optics and Photonics: Applications of Digital Imaging*, San Diego, 2017.) include:
  1. Embodiments of the new methods involve determination of a single quantization parameter (QP), that depends on the target compressed size, along with mappings that do not depend on the target size, from the QP value to a coarsest bit-plane to generate within each code-block.

2. Embodiments of the new methods involve collection of a simple set of statistics for each sub-band, from which it is possible to estimate the compressed size for each value of the above-mentioned QP value.
3. Embodiments of the new methods involve forecasting of the statistics associated with sub-band samples that have not yet been generated, so that the QP value can be updated regularly, based on the estimated compressed size derived from observed and forecast samples together.
4. For video applications, information from previous frames in the sequence is incorporated into the method of embodiments through an adaptive forecasting of statistics for unseen sub-band samples within the current frame, wherein forecasts are formed using both spatial and temporal reasoning.

The embodiments described here have applications in low and high memory software based encoding deployments, including GPU deployments, and in low and high latency hardware deployments. Embodiments allow latency and memory to be separately optimized against encoded image quality, while maintaining low computational complexity. In experimental studies, embodiments of this invention can significantly outperform previously reported complexity-constrained encoding strategies in terms of both image quality and throughput/complexity. While the main focus of embodiments is complexity-constrained HTJ2K encoding for images and video, embodiments can also be used to improve the robustness of conventional (i.e., J2K-1) JPEG 2000 encoding of video.

The present invention provides a method for complexity constrained encoding of JPEG 2000 code-streams, including JPEG 2000 and High Throughput JPEG 2000 code-streams, subject to an overall target length constraint, involving the steps of:
  a. collecting information about the sub-band samples produced by spatial transformation;
  b. generation of coded length estimates from said collected information, for a plurality of potential bit-plane truncation points and;
  c. determination of a quantization parameter (QP value) from these length estimates, such that after mapping the QP value to a base bit-plane index for each relevant code-block of each sub-band, the estimated overall coded length when truncating at these bit-plane indices is not expected to exceed said overall target length constraint;
  d. mapping said QP value to a base bit-plane index for each code-block;
  e. encoding each relevant code-block to the precision associated with the corresponding base bit-plane index, and encoding one or more additional coding passes from each such code-block; and
  f. subjecting all such generated coding passes to a post-compression rate-distortion optimization process to determine the final set of coding passes emitted from each code-block as the compressed result.

An embodiment describes methods for generating coded length estimates. An embodiment describes methods for incremental determination of the QP parameter, utilizing forecasts for the estimated coded lengths of unobserved sub-band samples, so as to reduce the amount of memory required to buffer sub-band samples ahead of block encoding. An embodiment extends the forecasting method to incorporate a robust combination of spatial and temporal forecasting for video applications. An embodiment involves application of the methods disclosed above to low latency image and video encoding.

The present invention further provides an apparatus for complexity constrained coding of code-streams, comprising an encoder arranged to implement the above methods.

The present invention further provides a computer program, comprising instructions for controlling a computer to implement the above methods.

The present invention further provides a non-volatile computer readable medium providing a computer program in accordance with the above.

The present invention further provides a data signal, comprising a computer program in accordance with the above.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF THE EMBODIMENTS

Figure 1:
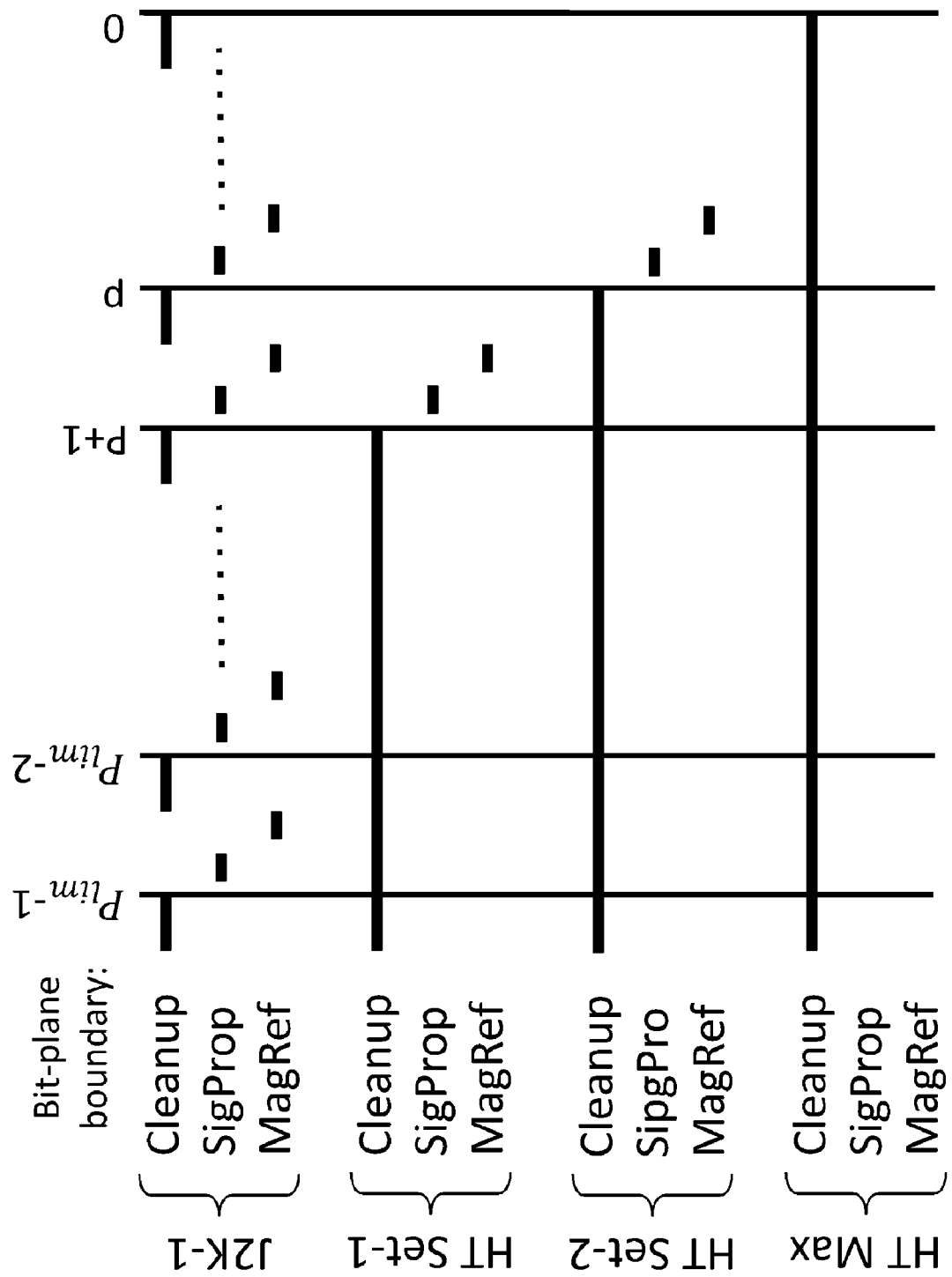
FIG. 1 is a diagram illustrating bit-plane contributions of the coding passes produced by the J2K-1 and HT algorithms.
Figure 2:
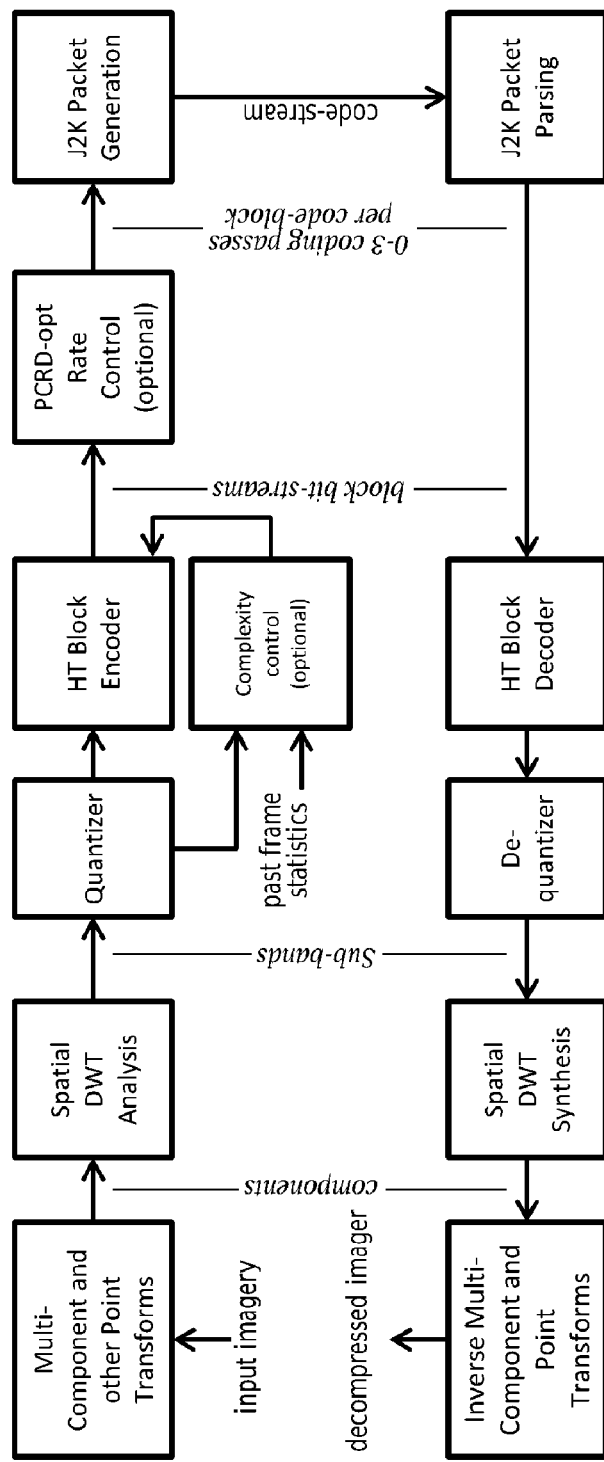
FIG. 2 is a block diagram of an HTJ2K encoding system based on the FBCOT (FAST Block Coding with Optimised Truncation) paradigm.

In the following description of embodiments of the invention, there are five "aspects" that are discussed.

$1^{st}$ Aspect: QP Based Complexity Control Using Coded Length Estimates

A key principal behind this embodiment is that a near-optimal set of quantization parameters for transformed imagery can all be described in terms of a single global parameter, identified here as QP (Note that this is not same as the QP parameter used in modern video codecs such as H.264/AVC, H.265/AVC or AV1, but it plays a related role). We begin by explaining this property.

Writing x as a vector that represents all samples in an image and $y_b[n]$ for the 2D sequence (indexed by $n \equiv [n_1, n_2]$) of sub-band samples from transform sub-band b, the relationship between transform and image domain representations can be expressed as $$x = \sum_b \sum_n y_b[n] \cdot s_{b,n}$$

where $s_{b,n}$ is the synthesis vector associated with location n in band b. Then the expected squared error distortion D in the image domain, due to quantization of the sub-band samples, can be written as $$D = E[\|x - x'\|^2] \approx \sum_b E[\|y_b - y_b'\|^2] \cdot G_b = \sum_b D_b \cdot G_b$$

where $D_b = E[\|y_b - y_b'\|^2]$ is the expected squared quantization error for the samples of sub-band b and $$G_b = \|s_b\|^2$$

is an "energy gain factor," which is the squared Euclidean norm (sum of squared sample values) of the synthesis vectors $s_{b,n}$-note that these are all translates of each other, so they all have the same Euclidean norm, except near the image boundaries.

More generally, we are often interested in minimizing a visually weighted distortion metric, which can be written as $$D = \sum_b D_b \cdot W_b G_b$$

where $D_b$ is still the expected mean squared quantization error for sub-band b and $W_b$ is a weighting factor that accounts for varying sensitivity of the human visual system to distortion in different spatial frequency bands.

At high bit-rates, a common distortion-rate model for the sub-band sample quantization process gives $$\frac{D_b}{N_b} \approx g \cdot \sigma_b^2 \cdot e^{-aL_b/N_b}$$

where $N_b$ is the number of samples in sub-band b, $\sigma_b^2$ is their variance, $L_b$ is the number of bits associated with the coded representation of these samples, and g and a can be taken as constants. All that matters is the exponential nature of the model, from which one can deduce that the sub-band quantization assignment that minimizes D subject to a constraint on the coded length $L = \Sigma_b L_b$, must minimize $$D + \lambda L = \sum_b N_b \cdot g \cdot \sigma_b^2 \cdot e^{-aL_b/N_b} \cdot W_b G_b + \lambda L_b$$

for some $\lambda > 0$, the solution to which is $$g \cdot \sigma_b^2 \cdot e^{-\frac{aL_b}{N_b}} = \frac{\lambda}{W_b G_b}, \forall b$$

That is, the mean squared quantization error in sub-band b satisfies $$\frac{D_b}{N_b} = \frac{\lambda}{W_b G_b}$$

Writing $\Delta_b$ for the quantization step size selected for sub-band b and $P_b$ for the number of least significant magnitude bit-planes discarded from the quantized sub-band samples, we have $$\frac{D_b}{N_b} \approx \frac{\Delta_b^2}{12} \cdot 2^{2P_b}$$

and so the right number of bit-planes to discard for a given operating point $\lambda$ is approximately $$P_b \approx \frac{1}{2}\log_2\left(\frac{12}{W_b G_b \Delta_b^2}\right) + \frac{1}{2}\log_2 \lambda$$

Henceforth, we interpret the first and second terms on the right hand side of the above equation as a sub-band specific bias parameter $\beta_b$ and the global quantization parameter QP, respectively, that is:

$$QP \triangleq \frac{1}{2}\log_2 \lambda \text{ and } \beta_b \triangleq \frac{1}{2}\log_2\left(\frac{12}{W_b G_b \Delta_b^2}\right)$$

The complexity control methods of this invention assign a "base Cleanup pass," denoted Cup0, for code-blocks of sub-band b, to correspond with bit-plane $$P_b = \max\{0, \lfloor QP + \beta_b + R_{off} \rfloor\} \quad (1)$$

where $R_{off}$ is a rounding offset, such as $R_{off} = \frac{1}{2}$. The actual value of $R_{off}$ is not really important, so long as it is consistent across all sub-bands b. The value of $P_b$ can be interpreted as the number of least significant magnitude bit-planes that will be effectively discarded from the quantized samples of sub-band b if the code-stream includes just this base Cleanup pass Cup0 for every code-block in the sub-band.

Figure 3:
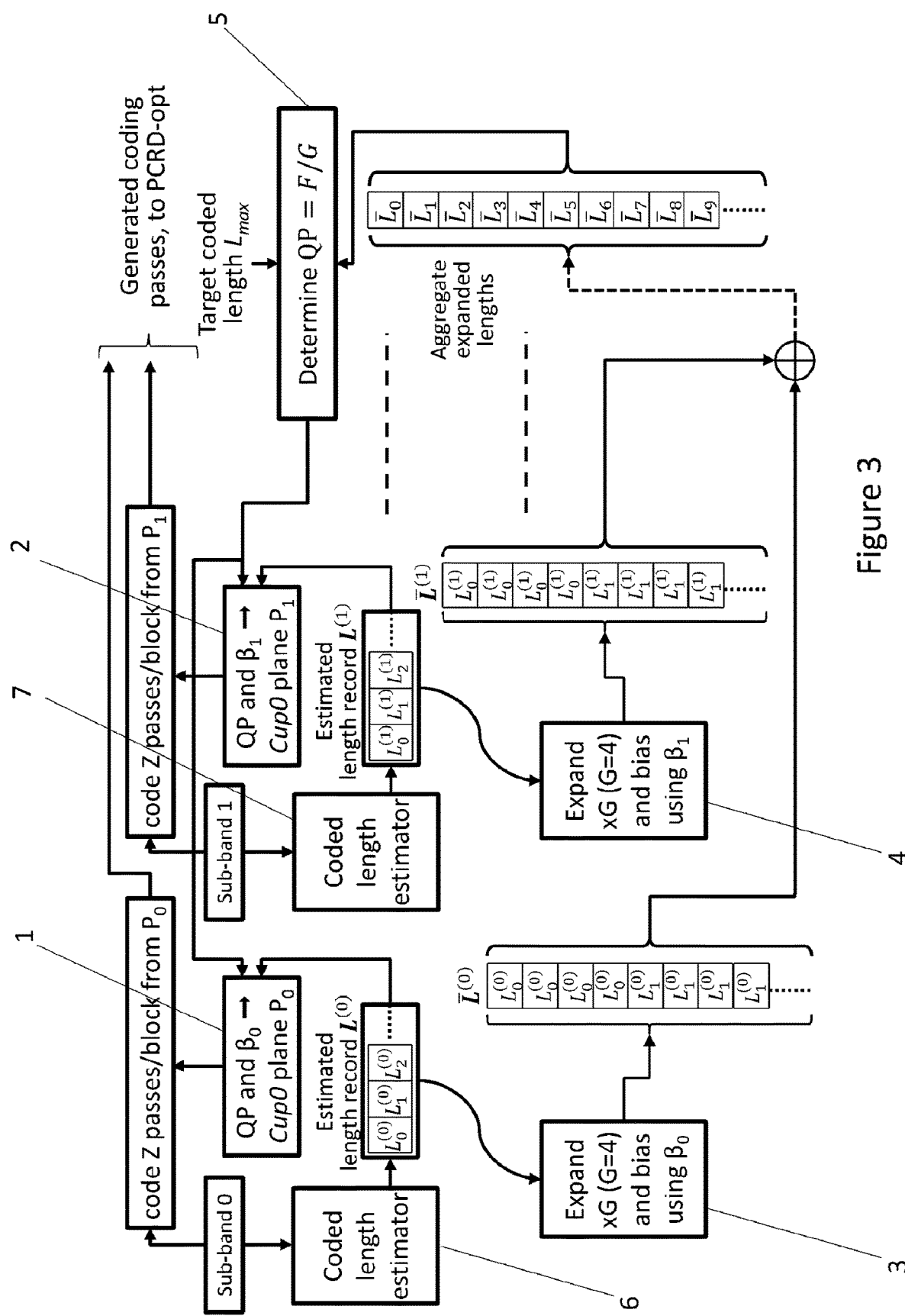
FIG. 3 is a diagram illustrating a core complexity control method in accordance with an embodiment of the present invention.

With these preliminaries out of the way, we are now in a position to describe the core complexity control method of this invention, which is illustrated in FIG. 3.

For each code-block of sub-band b, at most Z coding passes are generated, starting from bit-plane $P_b$, where a preferred value for Z is 6. The value of $P_b$ is determined from equation (1), using a QP value that is quantized to an integer multiple of G, which can be interpreted as a number of "grid" points between successive integers. In FIG. 3, G=4, which is a good choice. In terms of G, QP can be expressed in terms of an integer F as $$QP = \frac{F}{G}$$

and equation (1) can be rewritten as $$P_b = \max\left\{0, \left\lfloor \frac{F + \beta_b G + R_{off} G}{G} \right\rfloor\right\} = \max\left\{0, \left\lfloor \frac{F + \beta_b'}{G} \right\rfloor\right\} \quad (2)$$

where $\beta_b' = \lfloor \beta_b G + R_{off} G \rfloor$ is an integer bias for sub-band b. Equation (2) is implemented by the boxes marked with reference numerals 1 and 2 in FIG. 3.

In order to find the value of F (i.e., QP), the number of bytes associated with each candidate value p for $P_b$ is estimated, forming an "estimated length record" (or vector) $L^{(b)}$, containing the estimated lengths $L_p^{(b)}$ for each sub-band b and each feasible base bit-plane p. The actual length estimation method forms the $2^{nd}$ aspect of this invention, as described later in this document. We note here, however, that it is very important that these estimates are conservative, meaning that the total number of coded bytes associated with the Cleanup pass for bit-plane p over all code-blocks of sub-band b, should be close to but no larger than $L_p^{(b)}$.

The elements of each estimated length record $L^{(b)}$ are replicated G times and biased to form $$\overline{L}_f^{(b)} = L_{p(b,f)}^{(b)}, \text{ where } p(b,f) = \max\left\{0, \left\lfloor \frac{f + \beta_b'}{G} \right\rfloor\right\} \quad (3)$$

That is, each element $L_p^{(b)}$ of the $L^{(b)}$ vector is copied to G elements $\overline{L}_f^{(b)}$ of the $\overline{L}^{(b)}$ vector, starting from the element with $f = G \cdot p - \beta_b'$. This is the function of the boxes marked with reference numerals 3 and 4 in FIG. 3.
The expanded length vectors $\overline{L}^{(b)}$ are accumulated to form $\overline{L}$, whose elements are $$\overline{L}_f = \sum_b \overline{L}_f^{(b)} = \sum_b L_{p(b,f)}^{(b)}, \text{ where } p(b,f) = \max\left\{0, \left\lfloor \frac{f + \beta_b'}{G} \right\rfloor\right\} \quad (20)$$

Evidently, $\overline{L}_f$ is the (conservative) estimated number of coded bytes produced by the base Cleanup passes Cup0 of all code-blocks, if the integer F is chosen to be equal to f. The QP selection operation (box marked with reference numeral 5 in FIG. 3), simply selects $$F = \min\{f | \overline{L}_f \leq L_{max}\} \quad (4)$$

where $L_{max}$ is the target maximum number of coded bytes. Since the length estimates are conservative, the actual number of coded bytes associated with all base Cleanup passes should be significantly smaller than $L_{max}$, while the total number of coded bytes associated with the next finer Cleanup pass from all code-blocks is likely to be larger than $L_{max}$. So long as Z>3 coding passes are generated for each code-block, therefore, the PCRD-opt algorithm is likely to have sufficient raw material from which to achieve a total compressed size that is very close to $L_{max}$.

It is worth emphasizing the fact that in this invention, the length estimation process is not itself the basis for rate control—i.e., generating a code-stream with the desired coded length. The length estimation process intentionally under-estimates the coded length, ideally by a significant margin, and the coded length estimation methods are preferably very simple, so that they are not suitable for reliable rate control. Instead, rate control is performed by a post-compression rate-distortion optimization procedure, exploiting the availability of multiple truncation points for the code-blocks—i.e., multiple coded lengths and associated distortions for a code-block. Indeed, one source of inspiration for the invention is our recent discovery (demonstrated experimentally later in this document) that it is possible that it is possible to devise low complexity length estimators that have the desired level of conservatism with very high probability.

While the complexity control method described here is targeted towards High Throughput JPEG 2000, using the HT block coder, it may have application to other media coding systems. Most notably, the same complexity control method can be used to constrain the number of coding passes generated by the J2K-1 block coding algorithm, such that at most Z-1 passes are generated beyond the Cleanup pass associated with the base bit-plane $P_b$, for any given code-block in sub-band b. The J2K-1 block coder's coding efficiency is usually similar to that of the HT block decoder (e.g., ~10% better), so the same coded length estimation method can be used in both cases.

The main difference between the HT and J2K-1 block coding algorithms is that J2K-1 is fully embedded, so the J2K-1 block coder must produce all coding passes that are associated with coarser bit-planes than the base bit-plane $P_b$, so long as the code-block contains significant samples at those coarser bit-planes, whereas the HT block coder does not need to do this. Nonetheless, the fact that coding can stop Z-1 passes after the Cleanup pass at bit-plane $P_b$ can still represent a significant computational saving in comparison with naively generating all possible coding passes for each code-block.

The method can also be used to produce code-streams that may contain a mixture of code-blocks that use the HT block coding algorithm and code-blocks that use the J2K-1 block coding algorithm.

$2^{nd}$ Aspect: Coded Length Estimation Using Sub-Band Sample Statistics

We turn our attention now to the question of how the estimated lengths $L_p^{(b)}$ should be formed, as implemented by the boxes marked by reference numerals 6 and 7 in FIG. 3. The method models the coding cost of an algorithm for coding the quantization indices $$I_{b,p}[n] = \chi_b[n] \cdot \mu_{b,p}[n]$$

where $$\chi_b[n] = \begin{cases} 1 & y_b[n] \geq 0 \\ -1 & y_b[n] < 0 \end{cases} \text{ and } \mu_{b,p}[n] = \left\lfloor \frac{|y_b[n]|}{\Delta_b 2^p} \right\rfloor$$

are the sign and quantized magnitude, respectively, noting that the effective quantization step size is the actual step size $\Delta_b$ time $2^p$, since p is the number of least significant magnitude bits that are being discarded from each sample if we truncate beyond the Cleanup pass in bit-plane p.

The modeled algorithm codes the magnitudes $\mu_{b,p}[n]$, and the signs $\chi_b[n]$ of only those samples whose magnitude is non-zero. In preferred embodiments, the modeled algorithm is a crude approximation of the actual encoding algorithm. In particular, the modeled algorithm for the HT Cleanup encoder, deliberately omitting many of the features that make the actual HT Cleanup algorithm efficient, so as to obtain a conservative estimate of the coded length $L_p^{(b)}$. We describe here a specific embodiment that is both efficient to compute and effective in practice.

The first step of the estimation procedure involves the collection of quad significance statistics $C_{b,p}$ for each bit-plane p. Specifically, sub-band samples are partitioned into 2×2 quads, indexed by $q \equiv [q_1, q_2]$, such that sample $y_b[n]$ belongs to quad q if $$2q_1 \leq n_1 \leq 2q_1+1 \text{ and } 2q_2 \leq n_2 \leq 2q_2+1;$$

then for each quad, a binary significance value $\sigma_{b,p}[q]$ is set to 1 in bit-plane p if any of its samples has non-zero magnitude $\mu_{b,b}[n]$, i.e., $$\sigma_{b,p}[q] = \begin{cases} 0 & \mu_{b,p}[n] = 0, \\ 1 & \text{otherwise} \end{cases} \forall n \ni 2q_1 \leq n_1 \leq 2q_1 + 1 \text{ and}$$

$$2q_2 \leq n_2 2q_2 + 1;$$

and then the quad significance statistics are obtained by accumulating the $\sigma_{b,p}[q]$ values:

$$C_{b,p} = \sum_q \sigma_{b,p}[q]$$

Note that the statistics $C_{b,p}$ can be calculated without explicitly finding the individual $\mu_{b,p}[n]$ values. It is sufficient to first form the maximum magnitude over each quad, quantize to get $$\bar{\mu}_b[q] = \left\lfloor \frac{\max_{\substack{2q_1 \le n_1 \le 2q_1+1, \\ 2q_2 \le n_2 \le 2q_2+1}} |y_b[n]|}{\Delta_b} \right\rfloor$$

and then compare $\bar{\mu}_b[q]$ with $2^p$ for each candidate bit-plane p. Specifically, $C_{b,p}$ is just the number of quads q, for which $\bar{\mu}_b[q] \ge 2^p$.

The second step of the estimation procedure involves converting the statistics $C_{b,p}$ to estimated byte counts. The HT Cleanup encoding algorithm produces three byte-streams, known as the MagSgn byte-stream, the VLC byte-stream and the MEL byte-stream. The number of bits packed to the MagSgn byte-stream from a quad q depends upon a bound on the precision of the quantized magnitudes in the quad. In the actual algorithm, this bound is based on so-called "magnitude exponents" $E_{b,p}[q]$, such that $E_{b,p}[q]-1$ is the number of bits required to represent $\mu_{b,p}[n]-1$ for any samples in the quad, and the extra 1 accounts for the need to communicate sign bits for the non-zero samples. For the simplified model here, it is more convenient to use the quantity $$P_{b,p}[q] = \min\{P | \bar{\mu}_b[q] < 2^P\},$$

noting that $E_{b,p}[q]-1 \le P_{b,p}[q] \le E_{b,p}[q]$. We adopt a very simplistic model, in which the 4 samples in quad q all receive $P_{b,p}[q]$ magnitude bits, with only the non-zero samples receiving a sign bit. The fraction of samples in the quad that are non-zero is modeled as $1-2^{-P_{b,p}[q]}$. This model essentially assumes that the quantized sub-band sample magnitudes $\mu_{b,p}[n]$ are uniformly distributed over the interval from 0 to $2^{P_{b,p}[q]}-1$, which is a very conservative assumption for sub-band data that tends to follow something closer to a Laplacian probability distribution in practice. The total number of MagSgn bits under this model can be expanded as $$M_{b,p} = 4[C_{b,p} + C_{b,p+1} + C_{b,p+2} + \dots] +$$
$$4\left[C_{b,p} - \frac{1}{2}(C_{b,p} - C_{b,p+1}) - \frac{1}{4}(C_{b,p+1} - C_{b,p+2}) - \dots\right] =$$
$$4[C_{b,p} + C_{b,p+1} + C_{b,p+2} + \dots] + 2\left[C_{b,p} + \frac{1}{2}C_{b,p+1} + \frac{1}{4}C_{b,p+2} + \dots\right]$$

In addition to the magnitude and sign bits, we adopt a simple model for the cost of communicating the $P_{b,p}[q]$ values. The actual HT Cleanup encoder communicates magnitude exponent bounds differentially, which is different from communicating the $P_{b,p}[q]$ values, first because magnitude exponents $E_{b,p}[q]$ are not identical to the $P_{b,p}[q]$ values (there is an offset of 1 in the magnitudes that are bounded), and then because there is a complex inter-sample (not just inter-quad) dependency in the way the HT block coder communicates exponent bounds. One could try to model all this, but preferred embodiments instead rely upon the assumption that a simple coder that describes the same information should provide an upper bound for the coded length of the actual Cleanup algorithm. The simple coder recommended here involves independent signaling of $P_{b,p}[q]$ for each significant quad, using a unary (comma) code, combined with adaptive run-length coding of the quad significance symbols (via runs of insignificant quads) with a coding mechanism that is assumed to achieve the $0^{th}$ order entropy of the quad-significance symbols whenever the probability of significance is less than 0.5—the adaptive run-length coder cannot use less than 1 bit for each run, so it degenerates into emitting a single significance bit for each quad once the significance likelihood becomes larger than 0.5. These two aspects (quad significance coding and unary coding of $P_{b,p}[q]$ for significant quads) are somewhat analogous to the information communicated via the HT Cleanup coder's MEL and VLC byte-streams, respectively.

For the unary code, a first bit indicates whether or not $P_{b,p}[q]>1$, subject to the quad being significant (i.e., $P_{b,p}[q]>0$); a second bit indicates whether or not $P_{b,p}[q]>2$, subject to $P_{b,p}[q]>1$; and so forth. Accordingly, the total number of unary code bits for the sub-band is simply $$V_{b,p} = [C_{b,p} + C_{b,p+1} + C_{b,p+2} + \dots]$$

For the run-length coding of significance, the number of bits is approximated as $$R_{b,p} = Q_b \cdot H\left(\frac{C_{b,p}+1}{Q_b+1}\right) \quad (5)$$

where $Q_b$ is the total number of quads for the sub-band and H(u) is the entropy of a binary random variable with probability $\min\{0.5, u\}$. To evaluate the function H(u), preferred embodiments use a quantized log-like representation of u, such as that obtained by taking some of the most significant bits from a floating-point representation of u, as the index to a lookup table.

In some embodiments, the adaptive nature of the run-length coding procedure employed by the HT Cleanup pass can be incorporated by accumulating quad significance statistics first over individual line-pairs j within the sub-band, so that $C_{b,p} = \Sigma_j C_{b,p}^{(j)}$, and computing run-length bit counts separately for each line-pair j as $$R_{b,p}^j = Q_b^{line-pair} \cdot H\left(\frac{C_{b,p}^j+1}{Q_b^{line-pair}+1}\right)$$

where $Q_b^{line-pair}$ is the number of quads in a single line-pair. Then equation (5) is replaced by $$R_{b,p} = \sum_j R_{b,p}^j$$

Either way, the final estimated byte count for bit-plane p of sub-band b is formed simply by adding up the three components developed above and dividing by 8, resulting in $$L_{b,p} = \frac{M_{b,p} + V_{b,p} + R_{b,p}}{8} \quad (6)$$

In practice, we observe that $L_{b,p}$ invariably over-estimates the number of bytes required by the HT Cleanup encoding of bit-plane p, but tends to be smaller than the number of bytes required by the HT Cleanup encoding of the next finer bit-plane p−1, which is the property required by the overall complexity control algorithm of FIG. 3 to be successful if the number of generated coding passes for each code-block is at least Z=4. For each sub-band b, there will be a maximum bit-plane $P_b^{max}$ for which any quad is significant. For all $p > P_b^{max}$, $C_{b,p}=0$ and so the only non-zero contribution to equation (6) is the very small cost $R_{b,p}$ of communicating the fact that all quads are insignificant. In particular, for $p > P_b^{max}$, the value of $L_{b,p}$ found using the above procedure depends at most on the sub-band dimensions. While $P_b^{max}$ itself is data dependent, there is a well-defined bound $P_b^{bound}$ that depends only on the quantization step size $\Delta_b$, the properties of the transform used to produce sub-band samples, and the bit-depth of the original image sample values, such that $P_b^{max} \leq P_b^{bound}$. An implementation of the method can use this bound to determine the number of quad significance statistics $C_{b,p}$ that need to be collected for each sub-band b. In some applications, it is desirable to impose a fixed limit S on the number of quad significance statistics $C_{b,p}$ that are collected for sub-band b, regardless of $\Delta_b$, the transform properties or the image bit-depth. This can be done without significantly damaging the efficacy of the method, by taking advantage of the fact that for $p \ll P_b^{max}$ (i.e., at very high precisions), the following relationship tends to hold $$L_{b,p} \approx L_{b,p+1} + \frac{5}{8}Q_b$$

This is because at very high precisions, most samples in the sub-band become significant, so that $C_{b,p} \approx Q_b$, $(V_{b,p} - V_{b,p+1}) \approx Q_b$, $(M_{b,p} - M_{b,p+1}) \approx 4Q_b$ and $(R_{b,p} - R_{b,p+1}) \approx 0$. Using this relationship, embodiments can collect statistics $C_{b,p}$ and explicitly compute length estimates $L_{b,p}$ only for those bit-planes p such that $$P_b^{bound} \geq p \geq P_b^{min} = \max\{0, P_b^{bound} + 1 - S\}$$

deriving length estimates for each $$p \in [0, P_b^{min}) \text{ from } L_{b,p} = L_{b,P_b^{min}} + \frac{5}{8}Q_b(P_b^{min} - p).$$

The reader will appreciate that the coded length estimation method described above is only one of many related methods that can be used to provide a conservative model for the number of bytes produced by the HT Cleanup encoding procedure. More elaborate models can be used, that mimic the behaviour of the actual encoder more accurately, but practical experience suggests that these may not be justified, given the low complexity of the HT Cleanup encoder itself and the fact that the very simply model described above is sufficient even when the number of generated coding passes Z is small.

3rd Aspect: Online QP Adaptation Using Forecast Statistics

The complexity control method described in the 1st aspect requires coded lengths to be estimated from statistics collected from all sub-band samples, before the QP parameter can be computed. This in turn determines the coding passes that are generated by the block encoding process. As a result, the entire image, its quantized sub-band samples, or some equivalent set of data need to be buffered in memory before the block encoding process can commence. In many cases this leads to a high memory complexity, even if computational complexity is low.

Figure 4:
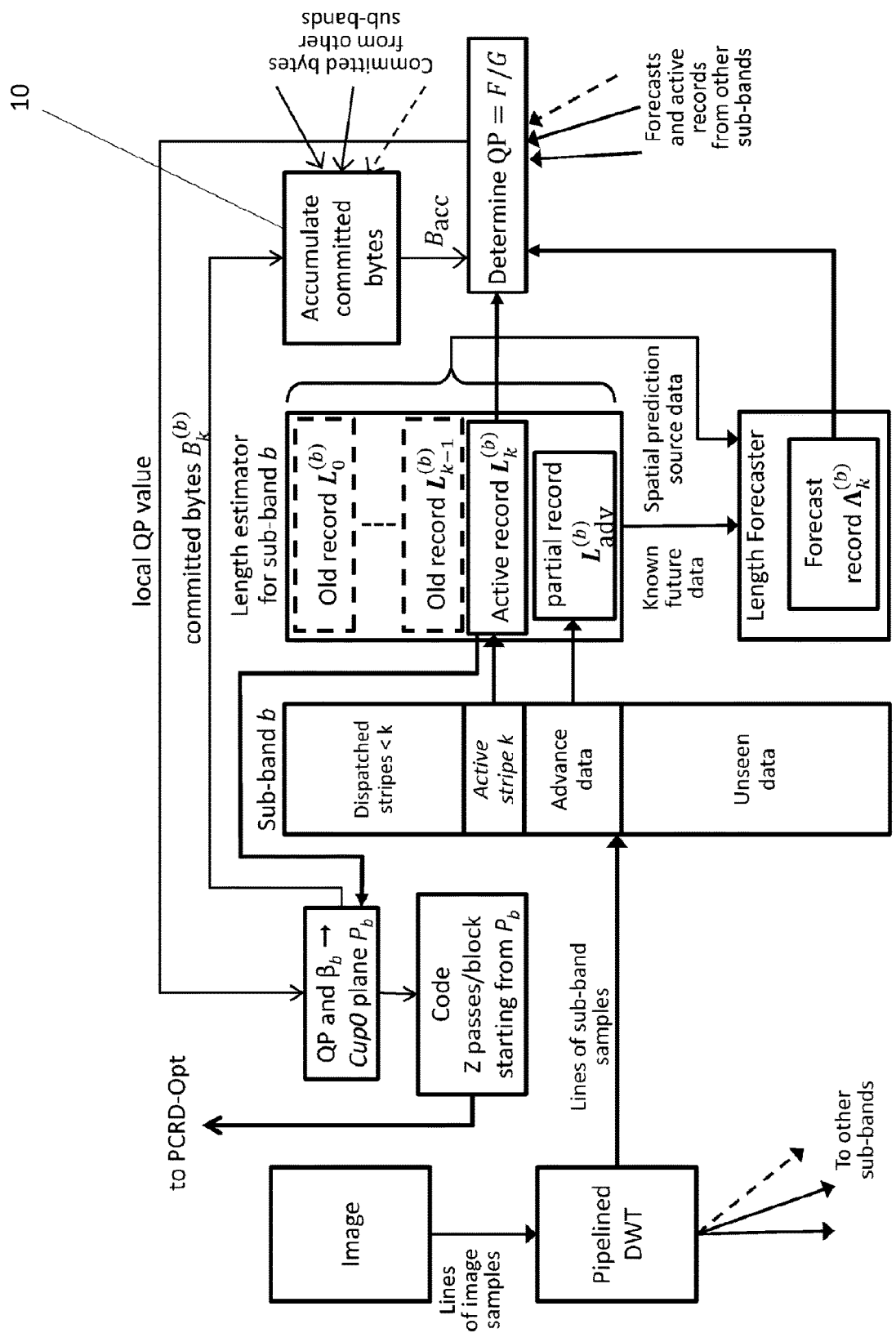
FIG. 4 is a diagram illustrating an on-line adaptive complexity control method in accordance with an embodiment of the present invention.

This 3rd aspect avoids high memory complexity by updating the QP value dynamically, based on the sub-band samples that have actually been produced by the spatial transform process. FIG. 4 illustrates the method, focussing on just one sub-band b, but identifying the role played by other sub-bands. The spatial transform (Discrete Wavelet Transform here) is pipelined so that the entire image does not need to be buffered in memory. As is well-known, image lines can be pushed incrementally to the DWT (Discrete Wavelet Transform), in a top-down fashion, which incrementally produces lines of sub-band samples for each sub-band b, using only a modest amount of internal state memory. Of course, bottom-up and column-wise incremental pushing of image data can similarly be realized if appropriate, but in most applications the image data arrives in raster scan order, so we describe the approach specifically for that case here. Sub-band samples are collected within a memory buffer, from which they are consumed by the block encoding process.

It is helpful to collect sub-band samples into stripes, where each stripe represents a whole number of code-blocks—typically one row of code-blocks—for the sub-band. As shown in the figure, at any given point in the process we can identify four categories of sub-band samples, as follows:

1. An "active stripe" k corresponds to sub-band samples that have been produced by the transform and are ready for a QP value (equivalently, an F value) to be assigned, allowing a base Cleanup bit-plane $P_b$ to be assigned and the block coding of these samples to proceed.
2. "Dispatched stripes" correspond to sub-band samples that have previously been active, having already been assigned a QP value (i.e., an F value) and hence a base Cleanup bit-plane $P_b$ for block encoding to proceed. These samples may well have been encoded already, but that is not a strict requirement. In parallel processing environments, code-blocks may be distributed to concurrent processing engines that may span more than one stripe, so that one or more dispatched stripes may still be in-flight while the QP value for the active stripe is being determined. The method described here does not require any tight synchronization between the complexity control and block encoding processes.
3. "Advance data" corresponds to sub-band samples that have been produced by the transform, but have not yet been collected into whole stripes, or their stripes have not yet been made ready for QP assignment. The height of the advance data can be understood as the delay between production of a new line of sub-band samples and the point at which those samples become active for QP assignment and encoding. Larger delays provide more known statistics from which to forecast the coded lengths of samples that lie beyond the active stripe, but this comes at the expense of more memory. In many applications, it is desirable to reduce the delay to 0, so that at the point when a new stripe becomes active, there are no advance data at all.
4. "Unseen data" corresponds to sub-band samples that have not yet been produced by the transform.

As in the complexity control method described in the 1st aspect, sub-band samples are used to generate coded length estimates $L_p^{(b)}$, for each candidate p for the base Cleanup pass (Cup0) bit-plane $P_b$. A difference here, is that the coded length estimates are collected into records that describe only one stripe of the sub-band. Specifically, the entries $L_{k,p}^{(b)}$ in record $l_k^{(b)}$ provide a conservative estimate for the number of coded bytes that will be produced by the encoding of the sub-band samples in stripe k of sub-band b, within the HT Cleanup pass for bit-plane p. In general, these lengths represent multiple code-blocks, specifically, all code-blocks that lie within stripe k.

In some embodiments, the length estimates $L_{k,p}^{(b)}$ may take fractional or floating-point values, rather than integers. The coded length estimation method described in the $2^{nd}$ aspect of the invention is naturally adapted to estimating the length contributions from individual line-pairs within the sub-band, so it can be helpful to compute and aggregate line-pair length estimates with fractional precision. This also allows partial length estimates to be formed from any "advance data," as defined above, and collected within a partial record $L_{adv}^{(b)}$.

In this aspect, a QP value is generated for the active stripe k within sub-band b, without waiting for all unseen data to become available. The method for generating these dynamic QP values is substantially similar to that described in the $1^{st}$ aspect. The main differences are:
1. There is a need to forecast the coded lengths associated with sub-band samples that lie beyond the active stripe.
2. There is a need to keep track of the estimated number of bytes associated with the base Cleanup passes of code-blocks that belong to dispatched stripes, since those may have had different QP values, based on which their base bit-plane $P_b$ was previously committed.

As shown in FIG. 4, the first issue mentioned here is addressed by a "length forecaster," which produces a forecast length record $\Lambda_k^{(b)}$ to represent the estimated lengths associated with all samples beyond the active stripe k. We discuss the forecasting process further below.

The second issue is addressed by extracting the estimated length $B_k^{(b)}$ from record $L_k^{(b)}$ at the point when the base bit-plane $P_b$ is determined using the QP value (equivalently, the integer value F such that QP=F/G). This is done by the box marked with reference numeral 10 in the figure, which uses equation (2) to obtain $P_b$ for the code-blocks in stripe k and reports $$B_k^{(b)} = L_{k,p}^{(b)}|_{p=P_b}$$

These $B_k^{(b)}$ values are accumulated for all dispatched stripes of all sub-bands to keep track of the total number of committed bytes $B_{acc}$. Note that the $B_k^{(b)}$ and $B_{acc}$ values are scalar, whereas the $L_k^{(b)}$ and $\Lambda_k^{(b)}$ are vector-valued records, representing a multitude of hypotheses p for the base bit-plane that has yet to be determined for the active stripe k.

The QP estimation procedure is similar to that employed in the $1^{st}$ aspect, except that the target maximum number of bytes $L_{max}$ is reduced by the number of bytes that have already been committed, $B_{acc}$, so that equation (4) becomes $$F = \min\{f | \overline{L}_f \leq L_{max} - B_{acc}\} \quad (7)$$

and $\overline{L}$ is computed online (i.e., adaptively) from the most recent forecasts and uncommitted active records of all sub-bands b. Specifically, writing $k_b$ for the index of the most recent active stripe for any given sub-band b, $\overline{L}_{k_b}^{(b)}$ for the expanded and biased version of its estimated length record $L_{k_b}^{(b)}$, following equation (3), $\overline{\Lambda}_{k_b}^{(b)}$ for the similarly expanded and biased version of its most recent forecast record $\Lambda_{k_b}^{(b)}$, and $D^{(b)}$ for the set of all dispatched stripe indices for sub-band b, $\overline{L}$ is found from $$\overline{L} = \Sigma_b \overline{\Lambda}_{k_b}^{(b)} + \Sigma_{b\,s.t.\,k_b \notin D^{(b)}} \overline{L}_{k_b}^{(b)} \quad (8)$$

To be concrete, the expand and bias operations of equation (3) here become
$\overline{L}_{k_b,f}^{(b)} = L_{k,p(b,f)}^{(b)}$ and $\overline{\Lambda}_{k_b,f}^{(b)} = \Lambda_{k,p(b,f)}^{(b)}$, $\forall f$, where $$p(b, f) = \max\left\{0, \left\lfloor \frac{f + \beta_b'}{G} \right\rfloor\right\}$$

and equation (8) means that $$\overline{L}_f = \sum_b \overline{\Lambda}_{k_b,f}^{(b)} + \sum_{b\,s.t.\,k_b \notin D^{(b)}} \overline{L}_{k_b,f}^{(b)}, \forall f$$

Note that $\overline{L}_f$ accounts for the (conservative) estimated coded lengths of all sub-band samples that do not belong to dispatched stripes within their sub-bands, for each hypothesis f on the value F that will be found via equation (7). Dispatched stripes are excluded, because all dispatched stripes have already been assigned an F value (i.e., a QP) and committed bytes to the tally in $B_{acc}$, as described above.

The QP (i.e., F) assignment procedure can be executed each time a new active stripe becomes available for any sub-band. In this case, the second sum in equation (8) might involve only the sub-band b for which the assignment is being executed, all other sub-bands having had their most recent active stripes previously dispatched. However, the procedure can also be executed less frequently, waiting until several sub-bands have active stripes ready for QP assignment, so that the second sum in equation (8) involves multiple terms. Executing the QP assignment procedure less frequently reduces the overall computation associated with expanding, biasing and accumulating estimated and forecast length records, although this computation is not overly burdensome.

We turn our attention now to the creation of forecast length records $\Lambda_k^{(b)}$. As shown in FIG. 4, the information available for generating forecasts consists of any partial estimated length record $L_{adv}^{(b)}$ that has already been formed from some or all of the advance data, together with the set of active and past estimated length records $\{L_i^{(b)}\}_{0 \leq i \leq k}$.

Writing $N_k^{(b)}$ for the number of sub-band lines represented by these length records, and $H^{(b)}$ for the height of the sub-band, a simple forecasting approach is to set $$\Lambda_k^{(b)} = L_{adv}^{(b)} + \frac{H^{(b)} - N_k^{(b)}}{N_k^{(b)}} \cdot \left(L_{adv}^{(b)} + \sum_{i=0}^{k} L_i^{(b)}\right) \quad (9)$$

In some embodiments, this simple uniform average may be replaced by a weighted average that places more emphasis on more recent estimated length records; this can be beneficial when $N_k^{(b)}$ is larger than the number of sub-band lines $H^{(b)} - N_k^{(b)}$ to which the forecast applies.

At the beginning, when the transform has produced only a small number of sub-band samples, some sub-bands might not yet have accumulated any active stripe, dispatched or otherwise. For these sub-bands b, there is no most recent active stripe, so $k_b = -1$. It is important that the first sum in equation (8) involves forecasts from every sub-band. In some embodiments, this requirement can be addressed by waiting until all sub-bands have active stripes before dispatching the first active stripe from any sub-band. However, this may consume significant memory resources in deep DWT hierarchies. A preferred approach is for all sub-bands to generate a first forecast length record $\Lambda_{-1}^{(b)}$ as soon as they have accumulated any partial coded length estimates $L_{adv}^{(b)}$. This may occur after the production of a single line-pair for the sub-band, so that the first execution of the QP assignment procedure is delayed until all sub-bands have received at least one pair of lines.

To further reduce delay and memory consumption, some embodiments may generate initial forecasts for sub-bands deep in the DWT hierarchy before any data becomes available. This can be done by scaling the forecasts produced by other higher resolution sub-bands in accordance with the sampling densities involved. Fortunately, low resolution sub-bands, for which sub-band samples might not be available when the QP assignment procedure is first executed, tend to have very low sample densities, so that they tend to have only a small impact on the $\Gamma$ vector that is used in the QP assignment of equation (7).

In other embodiments, a "background" estimated length record $L_{bg}^{(b)}$ may be employed for some or all sub-bands, containing lengths estimated offline, from other image data. An initial forecast can then be generated from this background data as $$\Lambda_{-1}^{(b)} = L_{adv}^{(b)} + \frac{W^{(b)} \cdot (H^{(b)} - N_k^{(b)})}{S_{bg}^{(b)}} \cdot L_{bg}^{(b)}$$

where $W^{(b)}$ is the width of sub-band b and $S_{bg}^{(b)}$ is the total number of samples from which the background length record $L_{bg}^{(b)}$ was derived—alternatively the background length record may be kept in normalized form as $L_{bg}^{(b)}/S_{bg}^{(b)}$. Some embodiments may include a contribution from any such background record when generating later forecasts $\Lambda_k^{(b)}$, especially when k is small.

The description provided above may appear to suggest that QP selection is a centralized process, using synchronized information from all sub-bands to form and distribute decisions that are used to determine the base bit-plane values $P_b$ for block encoding. However, the QP selection process can in fact be executed in a distributed fashion, using information that is not necessarily synchronized. In particular, each sub-band or group of sub-bands can be assigned its own local copy of the boxes marked reference numeral 10 FIG. 4, which accumulate committed bytes $B_k^{(b)}$ and determine QP (equivalently F) values. In a distributed implementation, each such local instance of the committed byte accumulator and QP generation processes still needs input from all other sub-bands, but this input can be delayed or partially pre-aggregated, relative to the active stripes for which QP estimates are being actively generated. In particular, the only external input required for correct operation of the local QP generation process is the cumulative sum of all committed byte counts from external sub-bands b, together with an augmented forecast vector that accumulates the latest forecasts from the external sub-bands $\Lambda_k^{(b)}$, plus any length estimates $L_k^{(b)}$ from external active stripes which have not yet been committed.

We finish our description of this $3^{rd}$ aspect by pointing out that the complexity constraint method here does not include the encoding process itself. Unlike the adaptive quantization schemes employed by many conventional coders, actual encoded lengths are not used to determine the QP value. Moreover, the QP value itself does not directly determine the quantized sub-band sample values, since the block encoder generates not only the base Cleanup pass whose bit-plane $P_b$ depends on QP, but Z–1 additional coding passes. These properties mean that the block encoding processes can be largely decoupled from the complexity control procedure, allowing implementations to support the considerable parallelism afforded by independent block coding. Moreover, the PCRD-opt algorithm is free to optimize the distortion-length trade-off associated with individual code-blocks, at any point. In some embodiments, the PCRD-opt procedure may be executed only once all coded data for an image or frame has been generated, maximizing its opportunity to distribute bits non-uniformly according to scene complexity. In other embodiments, the PCRD-opt procedure may be executed incrementally so as to emit finalized code-stream content progressively, reducing memory consumption and latency. Even then, however, the frequency with which the PCRD-opt procedure is executed can be very different to the frequency with which the QP assignment procedure is executed, since the two are decoupled.

These properties and opportunities all ultimately derive from the fact that the coded length estimation process is not used for rate control, as carefully expounded earlier.

4th Aspect: Enhanced Forecasting for Video Applications

For video applications, previously compressed frames can contribute to the forecasting of the coded lengths of unseen data in a current frame. As a starting point, the background length records $L_{bg}^{(b)}$ mentioned above, can be derived from the estimated length records in sub-band b of a previously compressed frame, and this background information can not only be used to form the initial forecast length record $\Lambda_{-1}^{(b)}$, but also contribute to regular forecast length records $\Lambda_k^{(b)}$ in the early stripes (small k) of each sub-band. This $4^{th}$ aspect goes further by providing a method for determining the reliability of length estimates from previous frames, and incorporating length estimates from previous frames into forecast lengths within a current frame based on this reliability.

In this $4^{th}$ aspect, a set of J "previous frame" summary length records $P_j^{(b)}$ are kept for each sub-band b, where $0 \le j < J$ and record j summarizes the coded lengths that were estimated for $H_j^{(b)}$ lines from the sub-band in a previous frame. As a recommended example, J=6 summary records are kept for each sub-band, whose heights $H_j^{(b)}$ divide the overall sub-band height $H^{(b)}$ roughly as follows:

$$J = 6 \text{ and } \begin{pmatrix} H_0^{(b)} \\ H_1^{(b)} \\ H_2^{(b)} \\ H_3^{(b)} \\ H_4^{(b)} \\ H_5^{(b)} \end{pmatrix} \approx H^{(b)} \cdot \begin{pmatrix} 2^{-4} \\ 2^{-4} \\ 2^{-2} \\ 2^{-2} \\ 2^{-2} \\ 2^{-3} \end{pmatrix}$$

Using the length estimation method described in the $2^{nd}$ aspect, coded length estimates are formed from quad significance statistics that can become available after each pair of sub-band lines has been produced; in this case the exact summary record heights $H_j^{(b)}$ should be multiples of 2. These incremental length estimates are aggregated to form "current frame" summary length records $C_j^{(b)}$, which become "previous frame" summary length records $P_j^{(b)}$ in the next frame. In memory-efficient embodiments, a $C_j^{(b)}$ record can overwrite the $P_j^{(b)}$ record as soon as it has been completely produced. For simplicity, the summary record heights $H_j^{(b)}$ are taken to be consistent across frames, so that $C_j^{(b)}$ and $P_j^{(b)}$ both represent coded length estimates for the same set of sub-band lines; however, variations of the method can readily be developed in which the heights are allowed to vary.

Recall that $N_k^{(b)}$ is the number of lines from sub-band b that have been used to form coded length estimates so far within the current frame. Let $j_k$ be the number of completed summary length records $C_j^{(b)}$ so that $C_{j_k}^{(b)}$ denotes the next summary length record, that is currently being assembled. It follows that $$\Sigma_{j=0}^{j_k-1} H_j^{(b)} \leq N_k^{(b)}$$

and $$H_{cur}^{(b)} = N_k^{(b)} - \Sigma_{j=0}^{j_k-1} H_j^{(b)}$$

is the number of sub-band lines that have already contributed length estimates to $C_{j_k}^{(b)}$.

An aggregate vector of coded length estimates for all $N_k^{(b)}$ lines from sub-band b that have been seen so far is $$C_{pre}^{(b)} = C_{j_k}^{(b)} + \Sigma_{j=0}^{j_k-1} C_j^{(b)} = L_{adv}^{(b)} + \Sigma_{i=0}^{k} L_i^{(b)}$$

noting that we are treating the incomplete $C_{j_k}^{(b)}$ an accumulator for length estimates from the line-pairs that have been seen since the completion of summary record $C_{j_k-1}^{(b)}$.

A similar vector, representing the same number of sub-band lines in the previous frame, can be formed as $$P_{pre}^{(b)} = \frac{H_{cur}^{(b)}}{H_{j_k}^{(b)}} P_{j_k}^{(b)} + \Sigma_{j=0}^{j_k-1} P_j^{(b)}$$

Then, a vector that represents length estimates in the previous frame for the $H^{(b)} - N_k^{(b)}$ sub-band lines that do not currently have length estimates in the current frame can be formed as $$P_{post}^{(b)} = \left(1 - \frac{H_{cur}^{(b)}}{H_{j_k}^{(b)}}\right) P_{j_k}^{(b)} + \Sigma_{j=j_k+1}^{J-1} P_j^{(b)}$$

In this aspect of the invention, the reliability of inter-frame length estimates is compared with that of intra-frame length estimates via the two quantities $$\Delta_{temporal}^{(b)} = \left| \frac{1}{N_k^{(b)}} \cdot U(C_{pre}^{(b)}) - \frac{1}{N_k^{(b)}} \cdot U(P_{pre}^{(b)}) \right|$$

and $$\Delta_{spatial}^{(b)} = \left| \frac{1}{H^{(b)} - N_k^{(b)}} \cdot U(P_{post}^{(b)}) - \frac{1}{N_k^{(b)}} \cdot U(P_{pre}^{(b)}) \right|,$$

where U(L) is a scalar measure of scene complexity derived from the estimated lengths vector L. A good choice for the function U( ) is an exponentially weighted sum, such as:

$$U(L) = \Sigma_{p>0} 2^{-p} \cdot (L_p - L_0) \quad (10)$$

If $\Delta_{temporal}^{(b)} > \Delta_{spatial}^{(b)}$, it is preferable to set the forecast vector $\Lambda_k^{(b)}$ to $P_{post}^{(b)}$, essentially assuming that the estimated byte counts for the $H^{(b)} - N_k^{(b)}$ missing sub-band lines in the current frame will be similar to those for the same sub-band lines in the previous frame—we call this "temporal forecasting." Otherwise, it is preferable to generate $\Lambda_k^{(b)}$ from $C_{pre}^{(b)}$, using equation (9) as in the 3rd aspect—we call this "spatial forecasting."

Preferred embodiments of the invention, avoid the extremes of pure temporal or pure spatial forecasting, when the sub-band has at least one active stripe in the current frame, by assigning $$\Lambda_k^{(b)} = L_{adv}^{(b)} + \begin{cases} \max\left\{P_{post}^{(b)}, \frac{H^{(b)} - N_k^{(b)}}{N_k^{(b)}} \cdot \widetilde{C}_{pre}^{(b)}\right\} & \text{if } \Delta_{temporal}^{(b)} < \Delta_{spatial}^{(b)} \\ \max\left\{\widetilde{P}_{post}^{(b)}, \frac{H^{(b)} - N_k^{(b)}}{N_k^{(b)}} \cdot C_{pre}^{(b)}\right\} & \text{if } \Delta_{temporal}^{(b)} \geq \Delta_{spatial}^{(b)} \end{cases}$$

Here, the notation $\widetilde{L}$ means that the individual coded length estimates $L_p$ within the vector L have been adjusted downwards so that max{P, $\widetilde{C}$ } is most likely constrained by P, while {$\widetilde{P}$, C} is most likely constrained by C. Specifically, a good choice for this downward adjustment process is to assign $$\widetilde{L}_p = \begin{cases} L_{p-1} & \text{if } p > 0 \\ 0 & \text{if } p = 0 \end{cases}$$

It will be apparent to those skilled in the art, that there are many different ways to avoid the extremes of pure temporal forecasting versus pure spatial forecasting, while still using the relationship between $\Delta_{temporal}^{(b)}$ and $\Delta_{spatial}^{(b)}$ to favour temporal or spatial forecasts.

It will also be apparent that the $U(P_{pre}^{(b)})$ values can be formed incrementally by applying equation (10) to each of the $P_j^{(b)}$ records as it is about to be overwritten by a completed $C_j^{(b)}$ record, and accumulating the results. This means that there is no need to provide storage for both the $C_j^{(b)}$ and $P_j^{(b)}$ summary records for a sub-band.

Furthermore, it will be apparent that although the formulas for $\Delta_{temporal}^{(b)}$ and $\Delta_{spatial}^{(b)}$ presented above involve height ratios, the costly division operations in these ratios can be avoided by standard cross multiplication techniques, since we are only interested in determining which of $\Delta_{temporal}^{(b)}$ and $\Delta_{spatial}^{(b)}$ is smaller.

5th Aspect: QP Adaptation for Low Latency Image and Video Encoding

The foregoing aspects support high throughput of imagery and video, with high quality rate control—i.e., accurately targeting a coded length target for the image or each frame of the video. Aspects 3 and 4 of the invention support low memory configurations, in which neither the image nor the sub-band samples need to be buffered fully in memory prior to block encoding. In all cases, the PCRD-opt stage of the overall encoding process can be deferred until all block encoding has completed for the image or for a video frame (even for a group of video frames), allowing coded bits to be distributed non-uniformly over space (or even time), in accordance with scene complexity. In many cases, this is a good strategy, because the total amount of coded data that needs to be buffered ahead of the PCRD-opt stage is usually much smaller than the amount of image or sub-band data that it represents.

Figure 5:
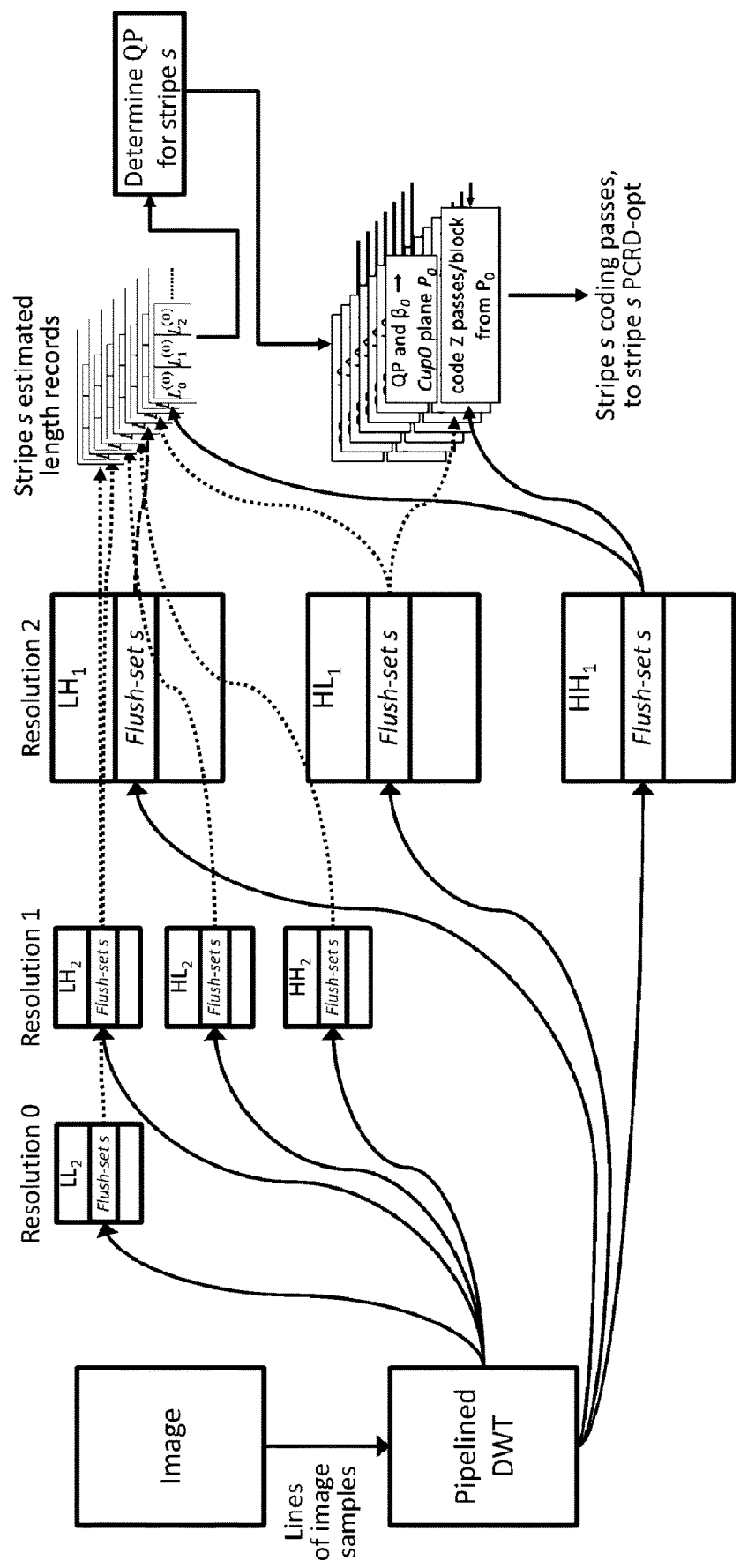
FIG. 5 is a diagram illustrating generation and encoding of flush-sets for low latency encoding in accordance with an embodiment of the present invention, illustrated for two levels of Mallat-style DWT. Not all connections from stripe buffers to coding processes are shown.

In low latency applications, such as sub-frame latency video coding, one cannot wait until all coded data for an image or frame has been produced before executing the PCRD-opt process and emitting the final code-stream. Moreover, in such applications, one often needs to consider a communication channel with a constant, or at least constrained, bit-rate when determining the end-to-end latency. The natural way to address such applications in the context of JPEG 2000 is to collect stripes of code-blocks from each of the sub-bands in the image or video frame into "flush-sets," as shown in FIG. 5, such that each sub-band is vertically partitioned into the same number of flush-sets, and each flush-set contains contributions from each sub-band that advance the coded image representation in a consistent way. For extremely low latencies, the number of vertical decomposition levels in the wavelet transform is often restricted to just 2 or 3, and rectangular code-blocks are employed that are much wider than they are high (e.g., 1024×4). JPEG 2000 precinct dimensions can be selected to ensure that code-block heights decrease by a factor of 2 with each level in the DWT hierarchy, and a spatially oriented progression order is selected so that the coded information for each flush-set can be emitted to the code-stream, as soon as it becomes available. The so-called PCRL (position, component, resolution, layer) progression order should usually be employed for low latency, where coded data appears in a vertical spatially progressive order (top to bottom), and for each spatial position the image components (usually colour planes) appear in order, and for each component at each spatial position successive resolutions appear in order, with successive quality layers (if more than one) of each precinct appearing consecutively. Vertical tiling can also be used to build flush-sets, but it is a less desirable approach, since introducing tile boundaries damages the properties of the DWT, reducing coding efficiency and potentially introducing visual artefacts into the decoded imagery at modest bit-rates.

The $1^{st}$ aspect is readily adapted to such low latency encoding environments by restricting the QP assignment process to just those sub-band samples and code-blocks that belong to a single flush-set. In a constant or constrained bit-rate environment, the number of coded bytes produced for any given flush-set is generally required to satisfy both a lower bound (underflow constraint) and an upper bound (overflow constraint). The upper bound on the compressed size for a flush-set becomes the $L_{max}$ parameter in FIG. 3. Once all sub-band lines for a flush-set have been produced by the transform, the method described in the $2^{nd}$ aspect is used to create estimated coded length records for the flush-set, which are used to assign a QP value for just that flush-set, based on the flush-set's $L_{max}$ constraint. This QP (equivalently F) value is used to derive the base bit-plane $P_b$ for all code-blocks in the flush-set that belong to sub-band b, whereupon block encoding is performed. Finally, the PCRD-opt algorithm is applied to the generated coding passes to produce a rate-distortion optimal representation of the flush-set that conforms to the $L_{max}$ upper bound. If the generated content is unable to satisfy the lower bound (underflow constraint) for a flush-set, stuffing bytes can be inserted into code-block byte streams in a way that does not affect the decoded result—both the J2K-1 and HT block coding algorithms support the introduction of stuffing bytes to the coded content.

To further reduce latency and/or memory consumption, some embodiments may employ the spatial forecasting methods described in the $3^{rd}$ aspect or (for video) the combined spatial and temporal forecasting methods described in the $4^{th}$ aspect, to allow the block encoding process within a flush-set to commence before all sub-band samples of the flush-set have been produced by the transform.

Experimental Results

Here we provide some experimental evidence for the effectiveness of embodiments of the invention.

First, we consider the compression of a single very large image. The image in question is an aerial photograph that measures 13333×13333, having RGB pixels with 24 bits each (8 bits/sample), occupying 533 MB on disk.

We compress the image to various bit-rates, using mean squared error peak signal-to-noise ratio MSE(PSNR) as the optimization objective for the PCRD-opt procedure. Code-block dimensions are 64×64 and the CDF9/7 wavelet transform is employed, along with the usual irreversible decor-relating colour transform (RGB to YCbCr in this case). We choose peak signal-to-noise ratio (PSNR) as the optimization objective so that the effect of complexity constrained encoding can be ascertained simply by measuring the PSNR of the decompressed code-stream, with the original image as reference. In each case, we compress the image to produce an HTJ2K code-stream conforming to JPEG 2000 Part-15, using the HT block coding algorithm exclusively. All compression and decompression are performed using the methods described hitherto.

We compare the performance associated with "Full" HT encoding, in which the block encoder produces a large number of passes, starting from the first (coarsest) significant bit-plane of each code-block, against that obtained using the methods described in the $3^{rd}$ aspect, with minimum delay (no "advance data" at the point when a stripe becomes active) and various numbers of HT coding passes Z. The length estimates themselves are formed using the $2^{nd}$ aspect. PSNR results for these different approaches are reported in Table 1. Evidently, for this type of content at least, it is sufficient for the HTJ2K encoder to produce at most Z=6 coding passes per code-block, which is much less than the number of passes produced by "Full" HT encoding.

TABLE 1

Compression of a large (0.5 GB) RGB aerial image to an HTJ2K code-stream, with various levels of HT encoder complexity control, corresponding to 3, 4 and 6 coding passes per code-block, followed by unweighted (PSNR-based) PCRD-opt rate control.

| bits/pel | JPH HT-FULL | JPH CPLEX-3p | JPH CPLEX-4p | JPH CPLEX-6p |
|---|---|---|---|---|
| 0.5 bpp | 32.29 dB | 32.00 dB | 32.29 dB | 32.29 dB |
| 1.0 bpp | 34.62 dB | 34.50 dB | 34.62 dB | 34.62 dB |
| 2.0 bpp | 38.48 dB | 38.30 dB | 38.48 dB | 38.48 dB |
| 3.0 bpp | 42.20 dB | 41.93 dB | 42.16 dB | 42.16 dB |
| 4.0 bpp | 45.54 dB | 45.35 dB | 45.53 dB | 45.53 dB |

Next, we explore the effectiveness of the combined spatial and temporal forecasting method described in the $4^{th}$ aspect, in comparison with the spatial-only (intra frame) forecasting method described in the $3^{rd}$ aspect. To do this, we construct an artificial 4K 4:4:4 RGB video sequence consisting of 48 frames with 5 scene cuts (6 segments), alternating between two different types of content. Four of the six segments are much easier to compress than the other two, with substantial amounts of overcast sky in the upper half of the picture, so that the scene complexity also varies strongly from the top to the bottom of the frame. The content is compressed to a bit-rate of 1 bit/pixel (bpp), with constant rate control, so that each frame has essentially the same compressed size, of $$3840 \times 2160 \times \frac{1}{8} = 1,036,800 \text{ bytes.}$$

Figure 6:
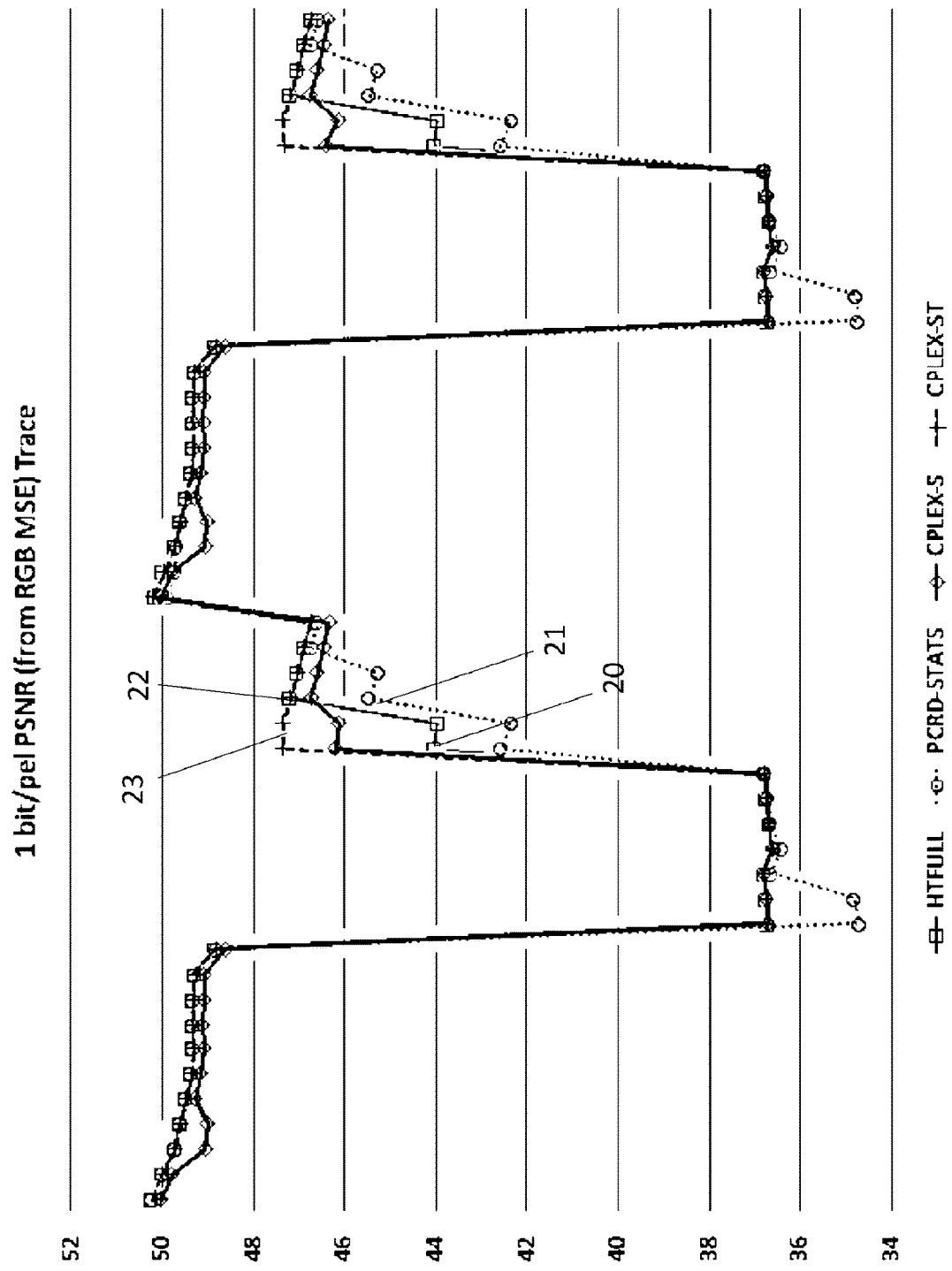
FIG. 6 is a graph illustrating exploration of complexity control strategies at 1 bpp on video with abrupt changes in scene complexity, composed of six segments, four of which have very low complexity in the upper half of the frame.

Each frame is encoded to produce an HTJ2K code-stream, conforming to JPEG 2000 Part-15, using the HT block coding algorithm exclusively. PSNR traces, from the average mean squared error in each frame across the R, G and B channels, are plotted in FIG. 6.

The "PCRD-STATS" trace in this figure corresponds to the existing "PCRD-STATS" method for complexity constrained HTJ2K encoding that was mentioned in "Background to the Invention," as described in WO2020/073098, where the set of coding passes generated for a given code-block are based on the operating point selected by the PCRD-opt procedure for the same code-block in the preceding frame, introducing extra coding passes in such a way as to allow progressive adaptation to changes in the scene content over time, while not producing more than Z=6 coding passes per code-block. The first frame is treated differently to get things started; in particular, for the results plotted in FIG. 6, all possible coding passes are generated for each code-block of the first frame.

The "CPLEX-S" trace in the figure corresponds to the method described in the $3^{rd}$ aspect, again with minimum memory, while the "CPLEX-ST" trace corresponds to the method described in the $4^{th}$ aspect. In both cases, the length estimates themselves are formed from quad significance statistics, following the $2^{nd}$ aspect, and at most Z=6 coding passes are generated for each code-block.

The "HTFULL" trace in the figure corresponds to "Full" HT encoding, where many coding passes are produced for each code-block, starting from the first (coarsest) bit-plane in which any sample of the code-block is significant. This approach is inherently more complex (lower throughput) than the other methods, since many more coding passes are generated by the HT block encoder. One would expect that "Full" HT encoding would also produce the highest PSNR, since the PCRD-opt procedure is configured to maximize PSNR (minimize MSE) and is provided with a larger set of options (coding passes) from which to determine the optimized truncation points for each generated code-stream. However, the "Full" HT encoding approach here uses the Kakadu™ software's slope threshold prediction feature, where the distortion-length slope threshold for a frame is estimated from that used in previous frames, and the estimated slope is used to terminate the block encoding process early, if appropriate, rather than generating all possible coding passes. This strategy for complexity control is described in D. Taubman, "Software architectures for JPEG2000," in *Proc. IEEE Int. Conf. DSP, Santorini, Greece*, 2002 and has been used successfully by JPEG 2000 encoders for many years, but it does exhibit a penalty in the transition from frames with high scene complexity to low scene complexity (low to high PSNR), as evidenced by trace reference numeral 20 in the figure. (Note: The Kakadu software is a widely used implementation of the JPEG 2000 suite of standards, whose tools are often used to produce reference results for JPEG 2000 in academic and commercial settings—these tools are available at http://www.kakadusoftware.com.)

Observe that the "PCRD-STATS" trace (reference numeral 21 in the figure) exhibits significant performance loss at scene transitions, especially in transitions from frames with low scene complexity to high scene complexity (high to low PSNR). This is because it assumes that local scene complexity will not change too rapidly from frame to frame, so it can wind up skipping too many coarse bit-planes in a high complexity frame that follows a low complexity one.

The purely intra-frame complexity control method from the $3^{rd}$ aspect (the reference numeral 22 "CPLEX-S" curve) is more temporally robust than both "HTFULL" and "PCRD-STATS", but suffers from some quality degradation in the easily compressed portion of the video where the upper part of each frame has very low scene complexity. This is not surprising, since the $3^{rd}$ aspect of the invention uses coded length estimates from the upper portion of each sub-band, that has already been produced by spatial transformation, to generate forecast lengths for the remaining (unseen) portion of the sub-band.

Overall, the combined spatial and temporal forecasting method from the $4^{th}$ aspect (reference numeral 23 "CPLEX-ST" curve) is superior to all other methods, both in temporal robustness and in overall compressed image quality.

The encoding methods of the above-described embodiments may be implemented by appropriate computing apparatus programmed with appropriate software. Embodiments of methods can be implemented in GPU deployments and in low and high latency hardware deployments.

Where software is used to implement embodiments, the software can be provided on computer readable media, such as discs or as data signals on a network, such as the internet, or in any other way.

The above described embodiments relate to use within the JPEG2000 (HTJ2K) and J2K formats. Embodiments of the invention are not limited to this. Some embodiments may be used in other image processing formats. Embodiments may find application in other image processing contexts.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method for complexity constrained encoding of code-streams, including JPEG 2000 and High Throughput JPEG 2000 code-streams, subject to an overall target length constraint, involving the steps of:
  a. collecting information about the sub-band samples produced by spatial transformation;
  b. generation of coded length estimates from said collected information, for a plurality of potential bit-plane truncation points, where coded length estimates are formed incrementally, as sub-band samples become available from the spatial transformation;
  c. determination of a quantization parameter (QP value) from these length estimates, such that after mapping the QP value to a base bit-plane index for each relevant code-block of each sub-band, the estimated overall coded length when truncating at these hit-plane indices is not expected to exceed said overall target length constraint;
  d. mapping said QP value to a base bit-plane index for each code-block;

e. encoding each relevant code-block to a precision associated with the corresponding base bit-plane index, and encoding one or more additional coding passes from each such code-block; and f. subjecting all such generated coding passes to a post-compression rate-distortion optimization process to determine a final set of coding passes emitted from each code-block as the compressed result, where the QP value is updated incrementally according to a coded length budget that starts out equal to the overall target length constraint, and code-blocks become available incrementally for coding, said code-blocks being identified as "dispatched code-blocks," involving the following steps:

i. collection of length estimates that are based on the samples that have become available for a sub-band into estimated length records;

ii. generation of forecast length records which anticipate the coded lengths that would be estimated for the samples that have not yet become available for the sub-band;

iii. incremental determination of a QP value, based on the estimated length records and forecast length records, such that after mapping the QP value to a base bit-plane index for each non-dispatched code-block of each sub-band, the estimated overall coded length for non-dispatched code-blocks, when truncating at these bit-plane indices, is not expected to exceed the remaining length budget;

iv. mapping said QP value to a base bit-plane index for non-dispatched code-blocks for which sub-band samples are available, such code-blocks being identified as "active code-blocks";

v. entering the active code-blocks into the set of dispatched code-blocks, while subtracting the estimated coded lengths, corresponding to truncation at their respective base bit-plane indices, from the coded length budget;

vi. encoding dispatched code-blocks to the precision associated with their respective base bit-plane indices, and encoding one or more additional coding passes from each such code-block; and vii. making all such generated coding passes available to the post-compression rate-distortion optimization process.

2. The method of claim 1, where a block coding algorithm of JPEG 2000 Part-1 is employed.

3. The method of claim 1, where a High Throughput block coding algorithm of JPEG 2000 Part-15 is employed, and the base bit-plane for a code-block corresponds to a first High Throughput (HT) Cleanup pass generated for that code-block.

4. The method of claim 1, where coded length estimates for a collection of sub-band samples are formed using a simplified model of the block coding process that lacks one or more features of the actual encoding process so that the estimated length for a given bit-plane truncation point is almost certainly larger than an actual coded length at that same point.

5. The method of claim 4, where coded length estimates for a collection of sub-band samples are formed from significance statistics, where a sample is significant at a bit-plane boundary if its quantized magnitude at that bit-plane would be non-zero.

6. The method of claim 5, where coded length estimates for a collection of sub-band samples are formed from quad significance counts, where a quad consists of 4 samples, and the count for a given bit-plane identifies the number of quads from the collection that would contain at least one significant sample in that bit-plane.

7. The method of claim 1, where length forecasts are obtained by extrapolating the estimated lengths determined from available sub-band samples within the same sub-band.

8. The method of claim 7, where forecasts incorporate background information concerning typical estimated lengths for similar image content, that has been collected previously.

9. The method of claim 1, where forecasts incorporate background information concerning typical estimated lengths for similar image content, that has been collected previously.

10. The method of claim 1, where the complexity constrained encoding procedure is applied to video, and the length forecasts for a given sub-band within a current video frame are determined using the sub-band samples observed in a previous frame.

11. The method of claim 10, where length forecasts for samples that are not yet available within a given sub-band of a current video frame are formed by combining the length estimates formed for corresponding sub-band samples in a previous frame, identified here as temporal forecasts, with extrapolated length estimates formed from available sub-band samples within the current frame, identified here as spatial forecasts.

12. The method of claim 11, where temporal and spatial forecasts are combined based on a reliability measure that compares the consistency of the length estimates for the available sub-band samples across frames with the consistency of the length estimates in the previous frame for those sub-band samples that are available and non-available, respectively, in the current frame.

13. The method of claim 1, where code-blocks of an image or video frame are partitioned into flush-sets, such that each flush-set has its own coded length constraints, and the QP generation, base bit-plane mapping, block encoding and post-compression rate-distortion optimization processes all operate flush-set by flush-set, based on the individual flush-set length constraints.

14. An apparatus for complexity constrained encoding of code-streams, comprising an encoder which is arranged to implement the method of claim 1.

15. A non-volatile computer readable medium, storing instructions for controlling a computer to implement a method in accordance with claim 1.

16. The method of claim 1, where coded length estimates for a collection of sub-band samples are formed using a simplified model of the block coding process that lacks one or more features of the actual encoding process so that the estimated length for a given bit-plane truncation point is almost certainly larger than an actual coded length at that same point.

17. The method of claim 16, where coded length estimates for a collection of sub-band samples are formed from significance statistics, where a sample is significant at a bit-plane boundary if its quantized magnitude at that bit-plane would be non-zero.

* * * * *